United States Patent [19]
Richards

[11] Patent Number: 5,655,495
[45] Date of Patent: Aug. 12, 1997

[54] PRE-START ENGINE OILER

[76] Inventor: John E. Richards, Rt. 9, Box 1408, Livingston, Tex. 77351

[21] Appl. No.: 726,840

[22] Filed: Oct. 8, 1996

[51] Int. Cl.$^6$ .................................................. F01M 5/00
[52] U.S. Cl. .............................. 123/196 S; 123/196 M; 184/6.3
[58] Field of Search .................... 123/196 R, 196 S, 123/196 M, 193.4, 193.6; 184/6.3

[56] References Cited

U.S. PATENT DOCUMENTS

| | | | |
|---|---|---|---|
| 3,583,525 | 6/1971 | Holcomb | 123/196 S |
| 3,722,623 | 3/1973 | Waldecker | 123/196 S |
| 4,061,204 | 12/1977 | Kautz, Jr. | 123/196 S |
| 5,069,177 | 12/1991 | Dokonal | 123/196 S |
| 5,121,720 | 6/1992 | Roberts | 123/196 S |
| 5,147,014 | 9/1992 | Pederson | 123/196 S |
| 5,156,120 | 10/1992 | Kent | 123/196 S |
| 5,197,424 | 3/1993 | Blum | 123/196 S |
| 5,353,759 | 10/1994 | Abe et al. | 123/196 M |
| 5,488,935 | 2/1996 | Berry, Jr. | 123/196 S |
| 5,494,012 | 2/1996 | Hagen | 123/196 S |

*Primary Examiner*—Erick R. Solis
*Attorney, Agent, or Firm*—Kenneth A. Roddy

[57] ABSTRACT

A pre-start engine oiler for internal combustion engines provides a pressurized charge of oil to the lubricating system when the ignition key is turned to the on position and prior to engaging the starter. A reservoir connected with a valve body is supplied with oil under pressure from the engine lubricating system through a check valve disposed in an oil passage in the body when the oil pump pressure exceeds the reservoir pressure during the course of operation. The oil passage is connected by an oil line to an existing oil conduit by a tee or to an adapter installed between the oil filter and the engine block. Oil ports above and below the check valve extend between the oil passage and a piston chamber containing a sliding piston which normally closes flow through the oil ports. The piston is retracted by a solenoid connected in series to the ignition circuit through an electronic timer and switch. When the ignition key is turned to the on position and before it reaches the start position to engage the starter, the solenoid is energized to retract the piston and rapidly discharge the pressurized oil from the reservoir through the oil ports and into the oil galley at a pressure approximately equal to the greatest oil pressure produced by the oil pump prior to the engine being turned off.

11 Claims, 4 Drawing Sheets

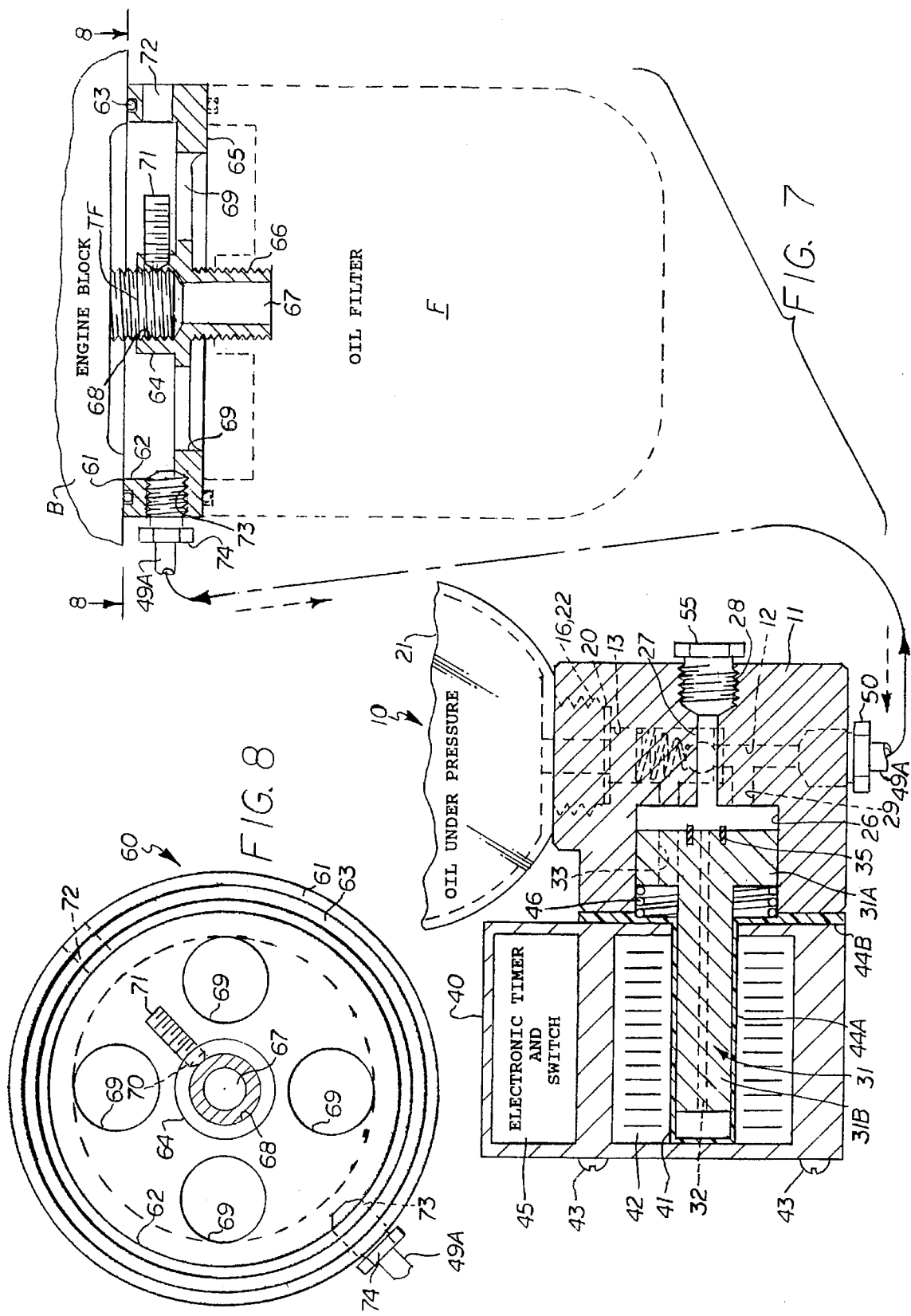

PRE-START ENGINE OILER

BACKGROUND OF THE INVENTION

1. Field of the Invention

This invention relates generally to preliminary lubrication devices which provide a pressurized charge of oil to the lubricating system of an engine upon starting, and more particularly to a pre-start engine oiler that is wired to the ignition system through a timing device to provide a presurized charge of oil to the lubricating system when the ignition key is turned to the on position and prior to engaging the starter and continues to supply the pressurized oil for a timed period after the engine is started and the oil pressure has built up to the normal operating pressure.

2. Brief Description of the Prior Art

It has been advertised by many major oil companies and lubrication suppliers and is a well known fact that 70% to 90% of all engine wear is caused when the engine is first started since the oil has drained away from the bearings, cylinder walls, and other wear points that are lubricated by oil from the oil pump once the oil pressure has built up to normal running pressure.

The oil pressure builds up slow when the engine is first started and usually takes 15 to 45 seconds to reach the maximum pressure. If a cold engine idles at about 1000 RPM, it will make about 250 to 750 revolutions before the oil pressure reaches maximum. It can take many revolutions before the oil pump builds enough pressure to start the cold oil flowing to the motor. Wear is caused by lack of lubrication being present on the moving parts when the engine is initially started, not the temperature of the engine or oil. It is estimated that if 70% to 90% of the engine wear can be eliminated, the life of the engine may be increased by about 3.3 to about 10 times it's present life.

Pre-start engine oiler devices are known in the art. There are several patents which disclose various pre-start engine oiling devices. Many of the prior art devices have solenoids which are engaged during the starting of the engine. However, most prior art engine oiler devices having solenoid valves controlled by the ignition circuitry do not have a timer circuit for maintaining the flow of oil between the pressurized oil reservoir and the engine lubricating system open for an extended period of time. In most internal combustion engines, the starter circuit becomes inactive after the engine starts, and thus the solenoid valve shuts off flow of the pressurized oil after the engine starts. Consequently, with many prior art ignition/solenoid controlled engine oiling devices, the time period that the oil under pressure is being conducted to the moving parts ceases after the engine starts, even though it still takes a few seconds of engine running after the engine starts before the oil pressure builds up to the normal operating pressure.

Another problem with many prior art engine oiling devices wherein the solenoid valve is closed after the engine starts is that they pressurize the existing oil galley which does not have passages in direct communication with the pistons and cylinder walls. Rather than lubricating the pistons directly prior to the engine starting, they depend upon the pressurized oil that is passed through the crankshaft bearings (which is shut off after the engine starts) and is slung onto the pistons.

Waldecker, U.S. Pat. No. 3,422,807 discloses a preliminary engine lubrication device wherein lubricant is stored under spring pressure in a reservoir in communication with the lubricating system during off-periods to be released upon closing the starting circuit. The reservoir is divided by a flexible diaphragm into an upper compartment which contains the oil and a lower compartment containing a compression spring and plunger connected to the underside of the diaphragm. A solenoid activated plunger releasably engages a groove on the diaphragm plunger. The diaphragm plunger is maintained in lower position with its bottom end engaging a switch to maintain it open when the oil pressure is normal. When the engine is shut down the diaphragm plunger is raised by the spring and closes the switch but is engaged by the solenoid plunger to prevent upward travel. When the engine is started again the solenoid plunger is retracted and the compression spring urges the diaphragm upward to discharge the oil into the lubricating system.

Waldecker, U.S. Pat. No. 3,722,623 discloses a preliminary engine lubrication device wherein lubricant is stored under spring pressure in a reservoir in communication with the lubricating system during off-periods to be released upon closing the starting circuit. The reservoir is divided by a flexible diaphragm into an upper compartment which contains the oil and a lower compartment containing a compression spring connected to the underside of the diaphragm. A normally closed solenoid valve is retracted in response to normal oil pressure allowing oil to pass into the upper chamber of the reservoir and to the lubricating system and is closed when the ignition circuit is off. When the engine is started again the solenoid valve is retracted and the compression spring urges the diaphragm upward to discharge the oil into the lubricating system. There is no timing means and the solenoid is energized when the engine starting circuit is activated is de-energized after the engine starts.

Holcomb, U.S. Pat. Nos. 3,556,070 and 3,583,525 disclose pre-start engine oiler devices wherein lubricant is stored under pressure in a reservoir in communication with the lubricating system during off-periods to be released upon closing the starting circuit. Flow of oil to and from the reservoir is controlled by a solenoid with one or more pistons. The reservoir is divided by a flexible diaphragm into an upper compartment containing air and a lower compartment which contains the oil. There is no timing means and the solenoid is energized when the engine starting circuit is activated is de-energized after the engine starts.

Raichel, U.S. Pat. No. 3,583,527 discloses a pre-start engine oil pressurizing device wherein a reservoir is supplied with oil during the course of operation from the high pressure side of the engine lubricating system through a forward flow passage having a first and second check valve between which a slide valve is disposed. The reservoir is also connected with the engine lubricating system through a backward flow passage having a third check valve and intersected by the third check valve and reservoir by the slide valve. The second valve is momentarily opened by a solenoid armature activated by the ignition switch permitting discharge of the pressurized oil into the lubricating system during initial operation of the engine before its lubricating system is effective. There is no timing means.

Dokonal, U.S. Pat. No. 5,069,177 discloses a pre-lubrication apparatus wherein oil is stored in an accumulator reservoir in communication with the oil galley and is selectively released prior to operation of the engine. The reservoir is divided by a flexible diaphragm into an upper pressurized air chamber with an air fill valve and a lower chamber with a normally closed solenoid valve connected at the bottom. The solenoid valve is connected by a conduit to an oil filter housing having a check valve and onto which is mounted the oil filter. The solenoid valve is normally closed by a spring and further aided by the engine oil pressure. The solenoid valve is selectively opened by a remote switch to discharge the pressurized oil to the oil filter and into the oil galley conduit. There is no timing means and the solenoid is selectively energized by a remote switch.

Kent, U.S. Pat. No. 5,156,120 discloses an engine pre-oiler wherein oil is stored under pressure in a reservoir in communication with the lubricating system. A special valve system is connected between the reservoir and the lubricating system, which includes a spring loaded closed pintle valve cooperating with the reservoir that is opened by energizing a solenoid in response to initiating the starting of the engine. A check valve is disposed inside the pintle valve and loads the oil under pressure into the reservoir and maintains its pressure until the pintle valve is opened by the solenoid.

Blum, U.S. Pat. No. 5,197,424 discloses a pre-lubrication system which includes a reservoir which holds a charge of oil under positive pressure and a solenoid operated valve and parallel check valve which cooperatively permit filling of the reservoir with oil during normal engine operation and maintaining the a pressurized charge of oil in the reservoir when the engine is stopped. There is no timing means and the solenoid valve is wired in parallel with the ignition for selective and/or automatic valve opening during the ignition sequence.

The present invention is distinguished over the prior art in general, and these patents in particular by a pre-start engine oiler for internal combustion engines which provides a pressurized charge of oil to the lubricating system when the ignition key is turned to the on position and prior to engaging the starter. A reservoir connected with a valve body is supplied with oil under pressure from the engine lubricating system through a check valve disposed in an oil passage in the body when the oil pump pressure exceeds the reservoir pressure during the course of operation. The oil passage is connected by an oil line to an existing oil conduit by a tee or to an adapter installed between the oil filter and the engine block. Oil ports above and below the check valve extend between the oil passage and a piston chamber containing a sliding piston which normally closes flow through the oil ports. The piston is retracted by a solenoid connected in series to the ignition circuit through an electronic timer and switch. When the ignition key is turned to the on position and before it reaches the start position to engage the starter, the solenoid is energized to retract the piston and rapidly discharge the pressurized oil from the reservoir through the oil ports and into the oil galley at a pressure approximately equal to the greatest oil pressure produced by the oil pump prior to the engine being turned off. Another aspect of the present invention is the provision of a second oil passage extending from the piston chamber connected to a modified engine having oil passages in the block communicating with grooves in the pistons to lubricate the pistons prior to starting the engine.

SUMMARY OF THE INVENTION

It is therefore an object of the present invention to provide an engine pre-start oiler which significantly reduces start-up wear of moving engine parts by supplying oil under pressure from a point in time before the starter is engaged and until the oil pump has built up the oil pressure equal to the normal operating oil pressure and is sufficient to lubricate the engine.

It is another object of this invention to provide an engine pre-start oiler which receives and maintains oil under pressure from the oil pump and discharges a charge of pressurized oil to the engine lubricating system at a pressure approximately the same as the greatest pressure produced by the oil pump during normal running conditions and which does not drop when the engine is turned off and the lubricating system is depressurized.

Another object of this invention is to provide an engine pre-start oiler which is wired into the engine ignition system through a timing device to provide a pressurized charge of oil to the lubricating system when the ignition key is turned to the on position and prior to engaging the starter and continues to supply the pressurized oil for a timed period after the engine is started and the oil pressure has built up to the normal operating pressure.

Another object of this invention is to provide an engine pre-start oiler which may be connected to the engine lubricating system by an adapter installed between the oil filter and the engine block to receive oil under pressure from the oil filter and discharge a charge of pressurized oil to the engine oil galley downstream from the oil filter.

Another object of this invention is to provide an engine pre-start oiler which may be connected to a modified engine block having oil passages communicating with grooves in the pistons to supply a charge of oil under pressure directly to the pistons prior to starting the engine.

Another object of this invention is to provide an engine pre-start oiler having a visually transparent oil reservoir to visually display the volume and the condition of oil contained therein.

A further object of this invention is to provide an engine pre-start oiler having a visually transparent oil reservoir with a scale thereon provided with calibrations corresponding to the volume and pressure of oil therein.

A still further object of this invention is to provide an engine pre-start oiler which is simple in construction with few moving parts, is inexpensive to manufacture, and is reliable in operation.

Other objects of the invention will become apparent from time to time throughout the specification and claims as hereinafter related.

The above noted objects and other objects of the invention are accomplished by a pre-start engine oiler for internal combustion engines which provides a pressurized charge of oil to the lubricating system when the ignition key is turned to the on position and prior to engaging the starter. A reservoir connected with a valve body is supplied with oil under pressure from the engine lubricating system through a check valve disposed in an oil passage in the body when the oil pump pressure exceeds the reservoir pressure during the course of operation. The oil passage is connected by an oil line to an existing oil conduit by a tee or to an adapter installed between the oil filter and the engine block. Oil ports above and below the check valve extend between the oil passage and a piston chamber containing a sliding piston which normally closes flow through the oil ports. The piston is retracted by a solenoid connected in series to the ignition circuit through an electronic timer and switch. When the ignition key is turned to the on position and before it reaches the start position to engage the starter, the solenoid is energized to retract the piston and rapidly discharge the pressurized oil from the reservoir through the oil ports and into the oil galley at a pressure approximately equal to the greatest oil pressure produced by the oil pump prior to the engine being turned off. Another aspect of the present invention is the provision of a second oil passage extending from the piston chamber connected to a modified engine having oil passages in the block communicating with grooves in the pistons to lubricate the pistons prior to starting the engine.

BRIEF DESCRIPTION OF THE DRAWINGS

FIG. 7 is a longitudinal cross section through the pre-start engine oiler connected to an adapter installed between the engine block and a conventional oil filter showing the piston in a "start" position supplying a charge of pressurized oil to the existing engine lubrication system.

FIG. 8 is a top plan view of the adapter.

DESCRIPTION OF THE PREFERRED EMBODIMENT

Figure 1:
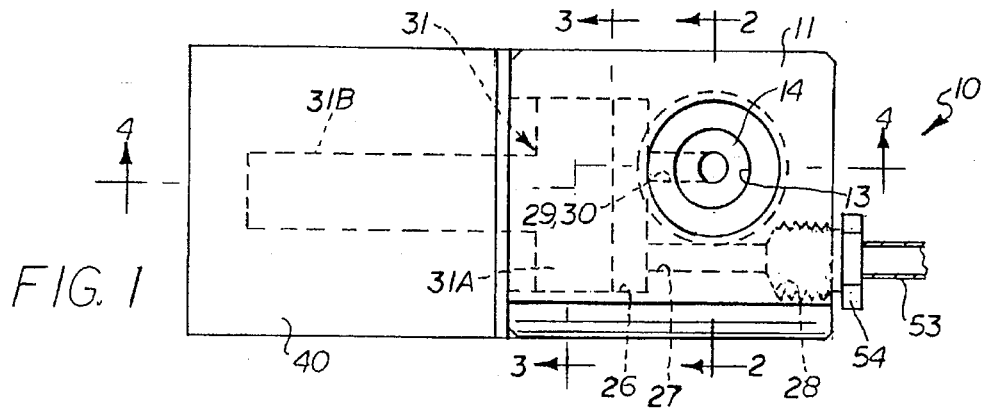
FIG. 1 is a top plan view of the pre-start engine oiler in accordance with a preferred embodiment of the present invention showing the offset bore arrangement with the reservoir and check valve removed for clarity.

Referring to the drawings by numerals of reference, there is shown in FIGS. 1, 2, 3, and 4, a preferred pre-start engine oiler 10. The pre-start engine oiler 10 has generally T-shaped main body 11 having a vertical bore or oil passageway 12 which has a larger diameter counterbore or check valve chamber 13 at an upper end that extends downwardly and defines a first radial shoulder 14 therebetween, and an internally threaded bore 15 at its bottom end. The upper end of the check valve chamber 13 has a larger diameter internally threaded bore 16 at its upper end which defines a second radial shoulder 17 therebetween. An elastomeric seal 18 is installed on the first radial shoulder 14 and serves as a valve seat. A ball 19A and a compression spring 19B are installed in the check valve chamber 13 above the seal 18 and form a check valve assembly 19.

A second elastomeric seal 20 is installed on the second radial shoulder 17. A hollow container or reservoir 21 having a reduced diameter externally threaded neck 22 at its bottom end is threadedly engaged in the threaded bore 16 at the top end of the main body 11 and in sealing relation with the seal 20. A valve stem 23 containing a one-way air fill valve 23A is installed in a threaded bore 24 at the top end of the reservoir 21 for conducting compressed air into the reservoir. In a preferred embodiment, the reservoir 21 is formed of transparent or translucent material and is provided with a scale 25 on its exterior with vertically spaced markings calibrated to visually display the volume of oil in the reservoir and indicate the pressure of the oil therein when the engine is turned on.

Figure 2:
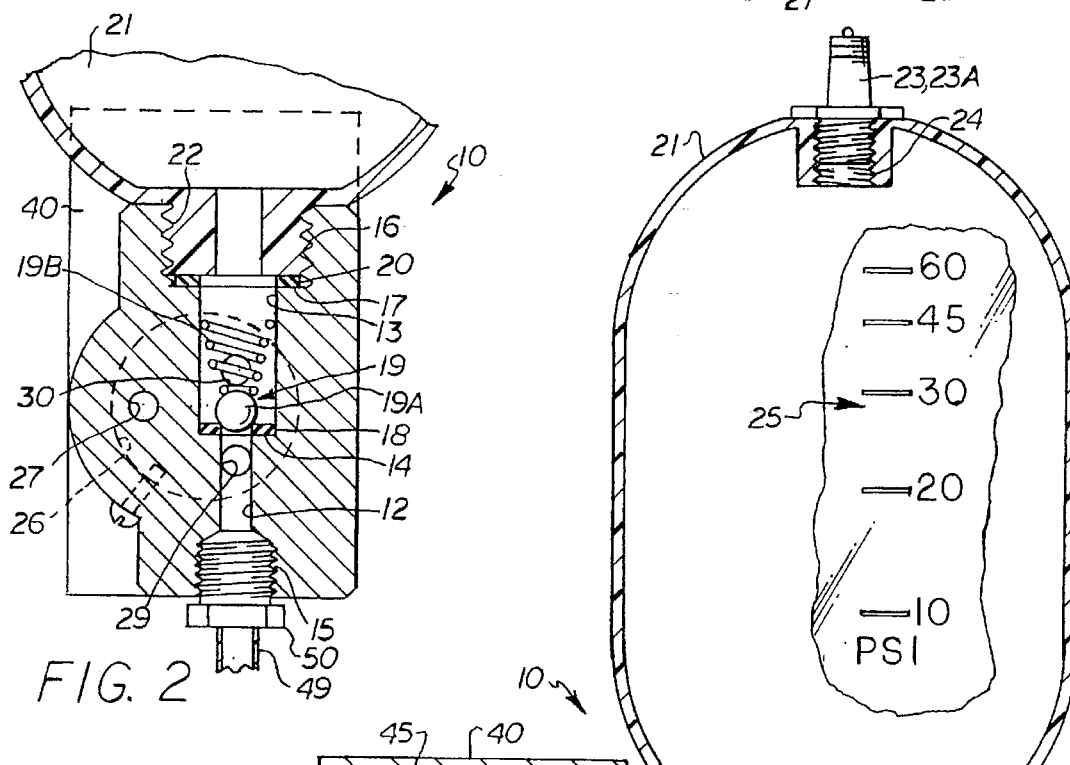
FIG. 2 is a transverse cross section through the pre-start engine oiler with the reservoir and check valve installed taken along line 2—2 of FIG. 1 showing the offset bore arrangement.

A large horizontal bore extends inwardly from one side of the main body 11 and terminates a distance from the vertical check valve chamber 13 to form a piston chamber 26. As best seen in FIGS. 1 and 2, a horizontal bore or oil passageway 27 extends inwardly through the main body 11 from the terminal end of the piston chamber 26, and is provided with a threaded bore 28 at its opposite end which extends inwardly from the opposite side of the main body. The bore or oil passageway 27 is laterally offset from the check valve chamber 13 so as not to intersect it.

Figure 3:
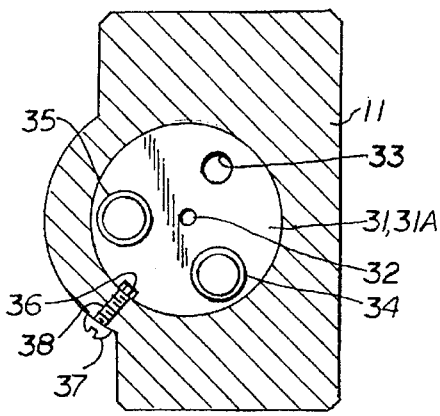
FIG. 3 is a transverse cross section through the pre-start engine oiler taken along line 3—3 of FIG. 1 showing the piston guide screw arrangement and the seals in the head of the piston.

As best seen in FIGS. 1 and 3, a lower horizontal bore or oil port 29 extends between the terminal end of the piston chamber 26 and the vertical bore 12 below the check valve chamber 13, and an upper horizontal bore or oil port 30 extends between the terminal end of the piston chamber 26 and the vertical check valve chamber 13.

Figure 4:
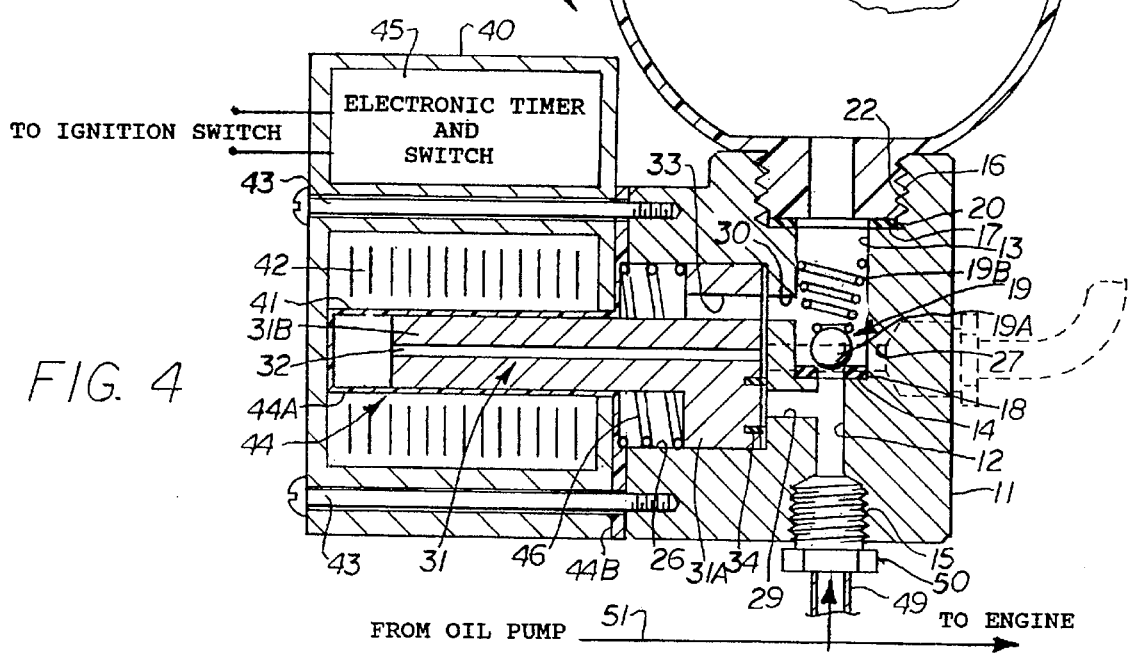
FIG. 4 is a longitudinal cross section through the pre-start engine oiler taken along line 4—4 of FIG. 1 showing the piston extended in an initial "fill" and "run" position after the pressure in the reservoir is equal to the pressure produced by the oil pump.

As best seen in FIGS. 3 and 4, a piston member 31 having a larger diameter head portion 31A at one end and a reduced diameter shaft portion 31B is installed in the piston chamber 26. The piston head portion 31A is received in the piston chamber 26 and its shaft portion 31B extends outwardly therefrom. A central longitudinal bore 32 extends through the center of the piston 31 from end to end to equalize pressure at each end of the piston. A bore 33 radially offset from the central bore 32 extends through the piston head 31A. The bore 33 is axially aligned with the horizontal upper bore 30 in the main body 11.

The inward facing surface of the piston head 31A is provided with a lower circular groove and a lower seal ring 34 installed therein. The center of the lower groove and seal ring 34 are axially aligned with the axis of the lower horizontal bore or oil port 29 that extends between the terminal end of the piston chamber 26 and the vertical bore or oil passageway 12 beneath the check valve chamber 13. The inward facing surface of the piston head 31A is also provided with an upper circular groove and a seal ring 35 installed therein. The center of the upper groove and seal ring 35 are axially aligned with the axis of the horizontal bore or oil passageway 27 that is offset from the check valve chamber 13 and which extends from the terminal end of the piston chamber 26 through the main body 11. The lower and upper grooves and seal rings 34 and 35 are sized to surround and form a sealing relation around the bores 29 and 27, respectively, when the piston head 31A is extended against the terminal end of the piston chamber 26.

As best seen in FIG. 3, a longitudinal guide slot 36 is formed in the outer circumference of the piston head 31A and a guide pin 37 is threadedly engaged in an angular threaded bore 38 in the main body 20 and its inward facing end is received in the guide slot. As the piston 31 moves, the guide slot 36 and piston slide relative to the end of the guide pin 37. The guide slot 36 prevents the piston 31 from rotating and maintains the bore 33 and the seal rings 34 and 34 axially aligned with the bores 31, 29, and 27, respectively.

A solenoid housing 40 having a horizontal bore 41 surrounded by a solenoid 42 is mounted on the piston chamber side of the main body 11 by bolts 43 which extend therethrough and are threadedly engaged in threaded bores in the main body. A seal boot 44 formed of dielectric material having a closed end tubular portion 44A is received in the bore 41 and has a radial flange portion 44B which extends radially outward and forms a seal between the facing surfaces of the main body 11 and the solenoid housing 40 when they are bolted together. The winding of the solenoid 42 surrounds the tubular portion 44A of the seal boot 44. An electronic timer and switch device 45 is contained in the solenoid housing 40 and is operatively connected with the solenoid 42. The solenoid 42 and the electronic timer and switch device 45 are commercially available items and are therefore shown schematically.

The solenoid 42 and the electronic timer and switch device 45 are connected in series between the ignition key switch and the starter motor such that the solenoid 42 will become energized immediately as the key is turned to the "on" position and before it reaches the "start" position, and after a preset time interval, the electronic timer and switch device will shut off current to the solenoid.

The outwardly extending portion of the shaft 31B of the piston 31 is slidably received in the tubular portion 44A of the seal boot 44 in the solenoid housing 40, and operates as the solenoid plunger. A compression spring 46 surrounds the piston shaft 31B and has one end engaged on the outward facing side of the piston head 31A and its opposite end is engaged on the flange 44B of the boot 44 between the facing surfaces of the main body 11 and the solenoid housing 40. The compression spring 46 urges the piston normally outward with respect to the solenoid 42 when the solenoid is not energized.

Figure 5:
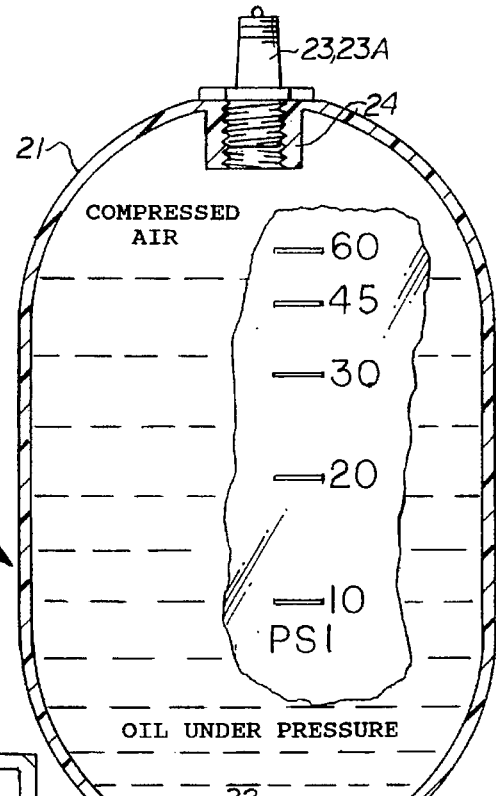
FIG. 5 is a longitudinal cross section through the pre-start engine oiler showing the piston retracted in a "start" position immediately after the ignition switch has been turned to the "on" position.
Figure 5:
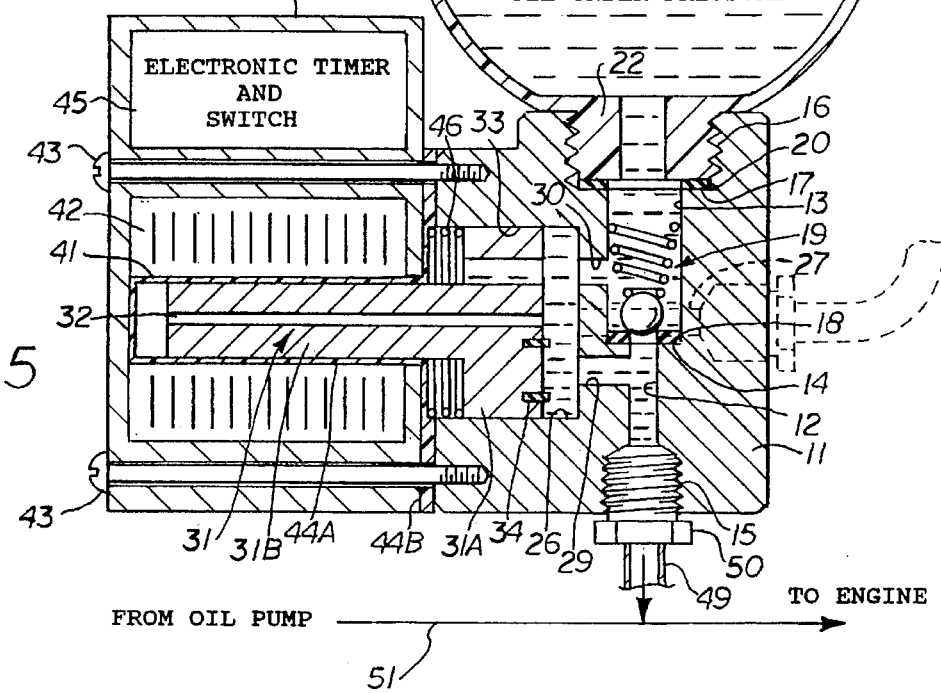
Figure 6:
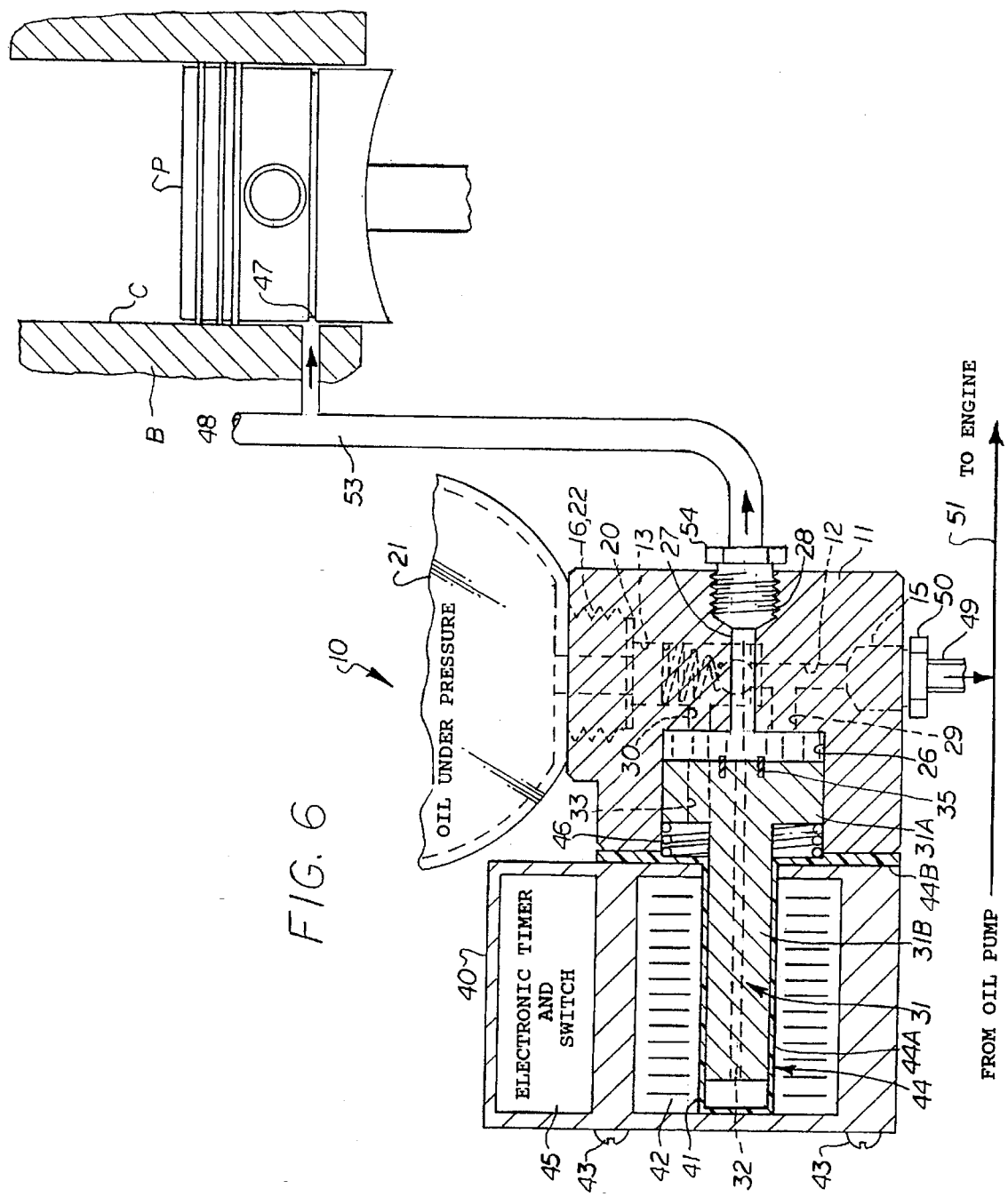
FIG. 6 is a longitudinal cross section through the pre-start engine oiler installed in a modified engine showing the piston in a "start" position supplying a charge of pressurized oil to an engine cylinder and to the exiting oil line.

As seen in FIG. 4, 5, and 6, the present pre-start engine oiler 10 may be installed on engines having a modified engine block B and pistons P wherein a small circumferential groove 47 is formed in the lower skirt of each piston and the engine block is provided with bores 48 extending radially outward from each cylinder C. The bores 48 are positioned to deliver oil to the grooves 47 in the pistons P as they move up and down in the cylinders C.

One end of a conduit or oil line 49 is connected to the main body 11 by a threaded tubing connector 50 threadedly engaged in the internally threaded bore 15 at the bottom end of the main body. The opposed end of the oil line 49 is connected into the existing conduit 51 extending between the oil pump and the oil galley conduits connected with the engine parts normally lubricated by the oil pump.

A second conduit or oil line 53 is connected to the main body 11 of the pre-start oiler 10 by a threaded tubing connector 54 threadedly engaged in the internally threaded bore 28 in the side of the main body. The opposed end of the second oil line 53 is connected to the bores 48 in the engine block B to supply oil through the bores to the grooves 47 in the pistons P.

As seen in FIGS. 7 and 8, the present pre-start engine oiler 10 may also be installed on conventional engines by using an adapter 60 which is installed between the engine block B and a conventional oil filter F. When using the adapter 60, the second oil line 53 and connector 54 described above are not used. Instead, the connector 54 is replaced by a solid threaded plug 55 which closes off flow from the bore or oil passageway 27 in the main body 11, and the first oil line 49A is connected to the adapter 60, as described below.

The adapter 60 is a circular disk-like member with one side 61 having the general configuration of the top end of a conventional oil filter with a recess 62 at the top end surrounded by an elastomeric seal 63 and a central reduced diameter neck 64. The opposite side 65 of the adapter 60 has the general configuration of the area of the engine block B which surrounds the threaded fitting TF that normally receives the top end of the oil filter. The side 65 has a central externally threaded reduced diameter neck 66 which is substantially similar to the existing threaded fitting TF. A bore 67 extends through the opposed necks 64 and 66, and is internally threaded 68 at the neck end 64 with threads corresponding to the threaded fitting TF.

A series of circumferentially spaced holes 69 extend through the adapter 60 to each side. A threaded bore 70 extends radially inward from the exterior of the neck 64 and receives a set screw 71. A bore 72 extends through the side wall of the adapter 60 for installing and removing set screw 71. A threaded bore 73 extends from the recess 62 to the exterior of the adapter 60. One end of the conduit or oil line 49A connected to the adapter 60 by a threaded tubing connector 74 threadedly engaged in the threaded bore 73 in the side of the adapter. The opposed end of the conduit or oil line 49A is connected to the bore 12 in the main body 11 by the connector 50.

The adapter 60 is installed on the engine block B by removing the existing oil filter F, threading the neck 64 onto the existing threaded fitting TF which normally receives the oil filter, and then securing it thereon with the set screw 71. The conduit or oil line 49A from the main body 11 is connected to the adapter 60 by the connector 74. The conventional oil filter F is then screwed onto the externally threaded neck 66 of the adapter 60. When properly installed, the seal ring 63 seals the recess 62 against the engine block B and the recess forms a cavity therebetween which receives a quantity of the oil being pumped through the oil filter and a momentary pressurized charge of oil from the pre-start oiler 10 as described below. After the adapter 60 has been installed, the oil filter F may be changed as usual except that it is installed on the adapter rather than the engine block.

OPERATION

When the pre-start engine oiler 10 is new, or immediately after the oil has been changed, the reservoir 21 is empty and the piston 31 is extended from the solenoid 42 by the spring 46, and fluid communication between the bores 29 and 30 is closed off (FIG. 4). When the ignition key is turned to its "on" position and approaches its "start" position to engage the starter, the electronic timer and switch device 45 delivers current to the solenoid 42, which retracts the piston 31 back to a "start" position and the oil ports 29 and 30 are open (FIGS. 5, 6, and 7). When the ignition key reaches its "start" position and engages the starter, the engine starts and the oil pump begins to build oil pressure, and pumps oil through the oil line 51 to the engine as normal, and also pumps oil through the oil line 49 to the pre-start engine oiler 10 and through the bore or oil passageway 12 and check valve 19 into the reservoir 21. After a few seconds, the electronic timer and switch device 45 shuts off the current to the solenoid 42 and the piston 31 is again extended to a "run" position by the spring 46 and the oil ports 29 and 30 are closed off. It should be noted that oil does not flow through the bore or oil passageway 27 and oil line 53 when the piston 31 is in the extended or "run" position, but only for the few seconds that the piston is in the temporary retracted or "start" position.

As the oil pump builds up pressure, oil continues to flow through the oil line 49 through the check valve 19 and into the reservoir 21. As the reservoir 21 is filled with oil, the air above the oil in the reservoir is compressed until it equals the maximum pressure produced by the oil pump while the engine is running (approximately 50 psi).

If the engine is slowed down, the pressure produced by the oil pump is reduced, and the check valve 19 closes and prevents pressure loss in the reservoir 21. Thus, the pressure in the reservoir 21 does not drop when the engine is slowed. If the engine is revved up, the oil pump produces a higher pressure. If this higher pressure is greater than the pressure in the reservoir 21, the check valve 19 opens and oil can flow into the reservoir until the oil pump pressure and reservoir pressure are equal. Thus, the oil pressure in the reservoir 21 will equal the greatest oil pressure produced by the oil pump until the engine is turned off. This is the amount of pressure that will be used to immediately shoot oil into the engine before the engine is started again. The reservoir holds this pressure until the ignition key is turned to its "on" or "start" position again.

After the initial filling process, when the ignition key is again turned to its "on" position and before it reaches the "start" position, the electronic timer and switch device 45 will energize the solenoid 42, which retracts the piston 31 back to the "start" position and the pressurized oil from the reservoir 21 will flow through oil ports 29, 30 and oil passageway 12 and the oil lines 49 and 51 to instantly lubricate all of the engine parts normally lubricated by oil from the oil pump. At the same time, oil will flow through the oil passageway 27, oil line 53, bores 48, and into the grooves 47 of the pistons P to lubricate the pistons and cylinder walls C. Thus, after the reservoir has once been pressurized, no time delay is required before the engine starts. If the bores 47 are offset from the axis of the cylinders, the pressurized oil will miss the piston rod and spray on the far wall of the cylinder when the pistons are above the bores. This prevents starting the engine with dry cylinder walls.

After a short period of time (approximately 15 seconds), the electronic timer and switch device 45 will switch off the current to the solenoid 42, and the spring 46 will extend the piston 31 back to the "run" position shutting off oil flow through bore 27 and oil line 53, and the reservoir 21 will again begin to fill with oil from the oil pump through the oil line 49, oil passageway 12, and check valve 19.

The filling operation of the pre-start engine oiler installed on conventional engines using the adapter 60 (FIGS. 7 and 8) is essentially the same as described above, except that the reservoir 21 is filled with oil which is pumped through the oil filter F and oil line 49A as the oil pump pumps oil to the engine. After the oil pressure in the reservoir 21 has become equal to the greatest oil pressure produced by the oil pump, and the engine is started again, a charge of the pressurized oil from the reservoir 21 will be sent through oil ports 29, 30 and oil passageway 12 and the oil line 49A and into the existing engine lubrication system galley connected with the oil filter to instantly lubricate all of the engine parts normally lubricated by oil from the oil pump.

With either installation, when changing the oil, the reservoir 21 may be emptied by turning the ignition key to its "on" position, but not all the way to the "start" position, and leaving it in this position for about 30 seconds. This will cause the electronic timer and switch device 45 to energize the solenoid 42 and retract the piston 31 back to its "start" position opening the bores 29 and 30, but the engine will not be started. This will allow the previously pressurized oil in the reservoir 21 to be pushed out through the oil line 49 or 49A, and the reservoir will empty. If the reservoir does not empty, a small amount of compressed air may be introduced into the reservoir through the air valve stem 23, and then the ignition key should be turned to its "on" position, but not all the way to the "start" position, and left in this position for about 30 seconds to purge the reservoir.

While this invention has been described fully and completely with special emphasis upon a preferred embodiment, it should be understood that within the scope of the appended claims the invention may be practiced otherwise than as specifically described herein.

I claim:

1. A pressurized pre-start engine oiling device for an internal combustion engine having an electrical ignition system that produces current in an on position and engages a starter in a start position and a lubricating system including an oil galley conduit pressurized by an oil pump to effect lubrication after the engine is started and when the engine is running and depressurized when the engine is not running and during the starting period, said device comprising:

a main body having a first oil passageway and a piston chamber disposed adjacent thereto, an upper and a lower oil port disposed in said main body extending between said first oil passageway for conducting oil to and from said piston chamber,;

an oil reservoir connected in fluid communication with said first oil passageway for containing a supply of oil under pressure;

a first oil line connected at one end with said first oil passageway and connected at another end to said lubricating system between said oil pump and said oil galley conduit for conducting oil between said first oil passageway, said oil pump, and said oil galley conduit;

a check valve in said first oil passageway disposed between said upper and lower oil ports and movable between an open position allowing oil under pressure to flow from said oil pump into said reservoir in response to oil pressure produced by said oil pump exceeding pressure in said reservoir and a closed position in response to oil pressure in said reservoir becoming approximately equal to the oil pressure produced by said oil pump;

a solenoid valve means having an extendible and retractable piston with a piston head slidably disposed in said piston chamber and having an oil bypass port extending therethrough in axial alignment with said first oil port, said piston head spring biased to a normally closed position closing off flow of oil through said lower oil port and retracted upon said ignition system being turned to the on position;

electronic timing and switch means connected with said solenoid valve means and said electrical ignition system to energize said solenoid valve means simultaneously upon said ignition system being turned to the on position and before engaging said starter and to deenergize said solenoid valve means after a preset time interval;

said reservoir being initially filled with oil under pressure when said ignition system is turned to the start position to engage said starter whereby said piston head is retracted allowing a portion of oil flowing from said oil pump to said oil galley conduit to flow into said reservoir through said first oil line, said first oil passageway, said lower and upper oil ports, and said check valve, and after the preset time interval said piston head is spring biased to its closed position by said switch means shutting off current to said solenoid valve means thereby closing off flow of oil through said lower oil port and allowing oil to flow into said reservoir through said check valve as said oil pump continues pumping oil whereby air trapped in said reservoir compresses the oil therein;

said check valve closing upon the oil pressure in said reservoir becoming approximately equal to the pressure produced by said oil pump to contain a charge of pressurized oil in said reservoir; thereafter said check valve opening in response to oil pressure produced by said oil pump exceeding the oil pressure in said reservoir and closing upon the oil pressure in said reservoir becoming approximately equal to the pressure produced by said oil pump to constantly maintain a charge of pressurized oil in said reservoir approximately equal to the greatest oil pressure produced by said oil pump when the engine is running and which does not drop when the engine is turned off and the lubricating system is depressurized; and when said ignition system is again turned to the on position and before it reaches the start position to engage said starter, said solenoid is energized by said timer and switch means to retract said piston head and allow said charge of pressurized oil to flow rapidly from said reservoir through said upper and lower oil ports, through said first oil line and into said oil galley conduit at a pressure approximately equal to the greatest oil pressure produced by said oil pump prior to the engine being turned off.

2. The pressurized pre-start engine oiling device according to claim 1 wherein said reservoir is formed of visibly transparent material to visually display the volume and the condition of oil contained therein.

3. The pressurized pre-start engine oiling device according to claim 1 wherein said reservoir is formed of visibly transparent material and is provided with a scale on its exterior with calibrations corresponding to the volume and pressure of oil therein.

4. The pressurized pre-start engine oiling device according to claim 1 wherein said reservoir has a valve stem at an upper end thereof in fluid communication with the reservoir interior and containing a one-way air fill valve for conducting air under pressure into said reservoir; and said reservoir may be emptied by turning said ignition system to its on position, but not to its start position and leaving it in the on position for a period of time whereby said electronic timer and switch means is energized by said solenoid and said piston head is retracted to open said upper and lower oil ports allowing previously pressurized oil in the reservoir to be expelled through said first oil line by the previously compressed air trapped therein; and in the event said reservoir does not empty, introducing air under pressure into the upper end of said reservoir through said valve stem and one-way air fill valve.

5. The pressurized pre-start engine oiling device according to claim 1 wherein said internal combustion engine is a piston engine of the type having at least one piston disposed in a cylinder for reciprocating movement therein and normally lubricated after the engine is started and when the engine is running and not lubricated when the engine is not running and during the starting period, and further comprising:

a circumferential groove formed on the exterior of each said piston, and an oil passageway in said engine having an end in communication with the interior side wall of the cylinder over which said piston travels in reciprocating movement and extending to the exterior of said engine;

said main body has a second oil passageway extending from said piston chamber to the exterior of said main body for conducting oil from said piston chamber when said piston head is retracted and flow of oil through said second passageway being shut off when said piston head is extended; and a second oil line connected between said second oil passageway and said oil passageway in said engine;

said reservoir being initially filled with oil under pressure when said ignition system is turned to the start position to engage said starter whereby said piston head is retracted allowing a portion of oil flowing from said oil pump to said oil galley conduit to flow into said reservoir through said first oil line, said first oil passageway, said lower and upper oil ports, through said check valve, and through said second oil passageway, through said second oil line, through said oil passageway in said engine and into said groove; and after the preset time interval said piston head is spring biased to its closed position by said switch means shutting off current to said solenoid valve means thereby closing off flow of oil through said second oil passageway and said lower oil port and allowing oil to flow into said reservoir through said check valve as said oil pump continues pumping oil whereby air trapped in said reservoir compresses the oil therein, and said check valve closing upon the oil pressure in said reservoir becoming approximately equal to the pressure produced by said oil pump to contain a charge of pressurized oil in said reservoir; thereafter said check valve opening in response to oil pressure produced by said oil pump exceeding the oil pressure in said reservoir and closing upon the oil pressure in said reservoir becoming approximately equal to the pressure produced by said oil pump to constantly main a charge of pressurized oil in said reservoir approximately equal to the greatest oil pressure produced by said oil pump when the engine is running and which does not drop when the engine is turned off and the lubricating system is depressurized; and when said ignition system is again turned to the on position and before it reaches the start position to engage said starter, said solenoid is energized by said timer and switch means to retract said piston head and allow said charge of pressurized oil to flow rapidly from said reservoir through said upper and lower oil ports, through said first oil line and into said oil galley conduit, and through said second oil passageway, through said second oil line, through said oil passageway in said engine and into said groove on said piston at a pressure approximately equal to the greatest oil pressure produced by said oil pump prior to the engine being turned off.

6. The pressurized pre-start engine oiling device according to claim 1 wherein said internal combustion engine lubricating system includes an oil filter removably mounted on its engine block in fluid communication with said oil galley and through which oil from said oil pump passes to enter said oil galley conduit, and said device further comprises:

a circular disk-like adapter having a first side configured to be secured on said engine block and a recess to form an enclosed chamber therebetween and a second side configured to threadedly receive and engage said oil filter;

a central inlet aperture extending between said first and second sides in fluid communication with said oil galley conduit for conducting oil under pressure from said oil pump into said oil filter and a plurality of circumferentially spaced outlet apertures surrounding said central aperture for conducting filtered oil under pressure from said oil filter through said enclosed chamber and back to said oil galley conduit to effect engine lubrication;

an oil passageway extending from said enclosed chamber to the exterior of said adapter; and said first oil line is connected at one end with said first oil passageway and connected at another end to said oil passageway to conduct a portion of the filtered oil under pressure between said first oil passageway, said oil pump, and said oil galley conduit;

said reservoir being initially filled with oil under pressure when said ignition system is turned to the start position to engage said starter whereby said piston head is retracted allowing a portion of oil flowing from said oil filter to said oil galley conduit to flow into said adapter chamber and through said oil port, and into said reservoir through said first oil line, said first oil passageway, said lower and upper oil ports, and said check valve, and after said check valve closes to contain a charge of pressurized oil in said reservoir; and when said ignition system is again turned to the on position and said piston head is retracted, said charge of pressurized oil flows rapidly from said reservoir through said upper and lower oil ports, through said first oil line, through said oil passageway into said adapter chamber, and into said oil filter and said oil galley conduit.

7. A pressurized pre-start engine oiling system comprising:

an internal combustion engine having at least one piston disposed in a cylinder for reciprocating movement therein, a circumferential groove formed on the exterior of said piston, an oil passageway having an end in communication with the interior side wall of the cylinder over which said piston travels in reciprocating movement and extending to the exterior of said engine, an electrical ignition system that produces current in an on position and engages a starter in a start position and a lubricating system including an oil galley conduit pressurized by an oil pump to effect lubrication after the engine is started and when the engine is running and depressurized when the engine is not running and during the starting period;

a pre-start engine oiling device having a main body with a first oil passageway and a piston chamber disposed adjacent thereto, an upper and a lower oil port extending between said piston chamber and said first oil passageway for conducting oil to and from said piston chamber, and a second oil passageway extending from said piston chamber to the exterior of said main body for conducting oil from said piston chamber;

an oil reservoir connected in fluid communication with said first oil passageway for containing a supply of oil under pressure;

a first oil line connected at one end with said first oil passageway and connected at another end to said lubricating system between said oil pump and said oil galley conduit for conducting oil between said first oil passageway, said oil pump, and said oil galley conduit;

a second oil line connected between said second oil passageway and said oil passageway in said engine;

a check valve in said first oil passageway disposed between said upper and lower oil ports and movable between an open position allowing oil under pressure to flow from said oil pump into said reservoir in response to oil pressure produced by said oil pump exceeding pressure in said reservoir and a closed position in response to oil pressure in said reservoir becoming approximately equal to the oil pressure produced by said oil pump;

a solenoid valve means having an extendible and retractable piston with a piston head slidably disposed in said piston chamber and having an oil bypass port extending therethrough in axial alignment with said first oil port, said piston head spring biased to a normally closed position closing off flow of oil through said lower oil port and said second oil passageway and retracted upon said ignition system being turned to the on position;

electronic timing and switch means connected with said solenoid valve means and said electrical ignition system to energize said solenoid valve means simultaneously upon said ignition system being turned to the on position and before engaging said starter and to deenergize said solenoid valve means after a preset time interval;

said reservoir being initially filled with oil under pressure when said ignition system is turned to the start position to engage said starter whereby said piston head is retracted allowing a portion of oil flowing from said oil pump to said oil galley conduit to flow into said reservoir through said first oil line, said first oil passageway, said lower and upper oil ports, through said check valve, and through said second oil passageway, through said second oil line, through said oil passageway in said engine and into said groove on said piston, and after the preset time interval said piston head is spring biased to its closed position by said switch means shutting off current to said solenoid valve means thereby closing off flow of oil through said lower oil port and said second oil passageway and allowing oil to flow into said reservoir through said check valve as said oil pump continues pumping oil whereby air trapped in said reservoir compresses the oil therein, and said check valve closing upon the oil pressure in said reservoir becoming approximately equal to the pressure produced by said oil pump to contain a charge of pressurized oil in said reservoir; thereafter said check valve opening in response to oil pressure produced by said oil pump exceeding the oil pressure in said reservoir and closing upon the oil pressure in said reservoir becoming approximately equal to the pressure produced by said oil pump to constantly maintain a charge of pressurized oil in said reservoir approximately equal to the greatest oil pressure produced by said oil pump when the engine is running and which does not drop when the engine is turned off and the lubricating system is depressurized; and when said ignition system is again turned to the on position and before it reaches the start position to engage said starter, said solenoid is energized by said timer and switch means to retract said piston head and allow said charge of pressurized oil to flow rapidly from said reservoir through said upper and lower oil ports, through said first oil line and into said oil galley conduit, and through said second oil passageway, through said second oil line, through said oil passageway in said engine and into said groove on said piston at a pressure approximately equal to the greatest oil pressure produced by said oil pump prior to the engine being turned off.

8. The pressurized pre-start engine oiling system according to claim 7 wherein said reservoir is formed of visibly transparent material to visually display the volume and the condition of oil contained therein.

9. The pressurized pre-start engine oiling system according to claim 7 wherein said reservoir is formed of visibly transparent material and is provided with a scale on its exterior with calibrations corresponding to the volume and pressure of oil therein.

10. The pressurized pre-start engine oiling system according to claim 7 wherein said reservoir has a valve stem at an upper end thereof in fluid communication with the reservoir interior and containing a one-way air fill valve for conducting air under pressure into said reservoir; and said reservoir may be emptied by turning said ignition system to its on position, but not to its start position and leaving it in the on position for a period of time whereby said electronic timer and switch means is energized by said solenoid and said piston head is retracted to open said upper and lower oil ports allowing previously pressurized oil in the reservoir to be expelled through said first oil line and said second oil lines by the previously compressed air trapped therein; and in the event said reservoir does not empty, introducing air under pressure into the upper end of said reservoir through said valve stem and one-way air fill valve.

11. The pressurized pre-start engine oiling system according to claim 7 wherein said internal combustion engine has an oil filter removably mounted on its engine block in fluid communication with said oil galley and through which oil from said oil pump passes to enter said oil galley conduit, and said system further comprises:

a circular disk-like adapter having a first side configured to be secured on said engine block and a recess to form an enclosed chamber therebetween and a second side configured to threadedly receive and engage said oil filter;

a central inlet aperture extending between said first and second sides in fluid communication with said oil galley conduit for conducting oil under pressure from said oil pump into said oil filter and a plurality of circumferentially spaced outlet apertures surrounding said central aperture for conducting filtered oil under pressure from said oil filter through said enclosed chamber and back to said oil galley conduit to effect engine lubrication;

an oil passageway extending from said enclosed chamber to the exterior of said adapter; and said first oil line is connected at one end with said first oil passageway and connected at another end to said oil passageway extending from said enclosed chamber to conduct a portion of the filtered oil under pressure between said first oil passageway, said oil pump, and said oil galley conduit;

said reservoir being initially filled with oil under pressure when said ignition system is turned to the start position to engage said starter whereby said piston head is retracted allowing a portion of oil flowing from said oil filter to said oil galley conduit to flow into said adapter chamber and through said passageway extending from said chamber, and into said reservoir through said first oil line, said first oil passageway, said lower and upper oil ports, and through said check valve, and through said second oil passageway, through said second oil line through said oil passageway and into said groove, and after said check valve closes to contain a charge of pressurized oil in said reservoir; and when said ignition system is again turned to the on position and said piston head is retracted, said charge of pressurized oil flows rapidly from said reservoir through said upper and lower oil ports, through said first oil line, through said oil passageway into said adapter chamber, and into said oil filter and said oil galley conduit, and through said second oil passageway, through said second oil line, through said oil passageway in said engine and into said groove on said piston.

\* \* \* \* \*